(12) United States Patent
Roberson et al.

(10) Patent No.: US 9,063,608 B2
(45) Date of Patent: Jun. 23, 2015

(54) SYSTEMS AND METHODS FOR SENSOR DEVICES HAVING A NON-COMMENSURATE NUMBER OF TRANSMITTER ELECTRODES

(75) Inventors: Jeremy Roberson, San Francisco, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 562 days.

(21) Appl. No.: 13/523,183

(22) Filed: Jun. 14, 2012

(65) Prior Publication Data

US 2013/0335252 A1 Dec. 19, 2013

(51) Int. Cl.
*G06F 3/044* (2006.01)
*G06F 3/041* (2006.01)

(52) U.S. Cl.
CPC ............. *G06F 3/0416* (2013.01); *G06F 3/044* (2013.01)

(58) Field of Classification Search
CPC ................................ G06F 3/044; G06F 3/0416
USPC .............................. 341/173, 33; 345/173, 174
See application file for complete search history.

(56) References Cited

U.S. PATENT DOCUMENTS

| | | | |
|---|---|---|---|
| 4,170,025 A | 10/1979 | Benkley et al. |
| 4,459,541 A | 7/1984 | Fielden et al. |
| 4,733,222 A | 3/1988 | Evans |
| 4,974,236 A | 11/1990 | Gurcan et al. |
| 5,304,937 A | 4/1994 | Meyer |
| 5,305,017 A | 4/1994 | Gerpheide |
| 5,648,642 A | 7/1997 | Miller |
| 5,666,113 A | 9/1997 | Logan |
| 5,787,126 A | 7/1998 | Itoh et al. |
| 5,790,106 A | 8/1998 | Hirano et al. |
| 5,825,352 A | 10/1998 | Bisset et al. |
| 5,841,078 A | 11/1998 | Miller |

(Continued)

FOREIGN PATENT DOCUMENTS

| | | |
|---|---|---|
| EP | 0749086 A1 | 12/1996 |
| EP | 1624399 A1 | 2/2006 |

(Continued)

OTHER PUBLICATIONS

The International Bureau of WIPO, PCT International Preliminary Report on Patentability in PCT International Application No. PCT/US2011/051998, mailed Mar. 28, 2013.

(Continued)

*Primary Examiner* — Edwin Holloway, III
(74) *Attorney, Agent, or Firm* — Osha Liang LLP

(57) ABSTRACT

A processing system for an input device includes a transmitter modules coupled to a plurality of transmitter electrodes including a first set and a second set of transmitter electrodes, the first set and second set being disjoint and having different sizes. The transmitter module is configured to simultaneously transmit a first plurality of transmitter signals with the first set of transmitter electrodes during a first period, and to simultaneously transmit a second plurality of transmitter signals with the second set of transmitter electrodes during a second period, wherein the first period and the second period are non-overlapping. Each of the first plurality of transmitter signals is based on a different sequence of a code, which includes a set of mathematically independent sequences and has a size equal to the size of the first set of transmitter electrodes.

20 Claims, 6 Drawing Sheets

(56) References Cited

U.S. PATENT DOCUMENTS

| | | |
|---|---|---|
| 5,861,875 A | 1/1999 | Gerpheide |
| 5,880,411 A | 3/1999 | Gillespie et al. |
| 5,917,906 A | 6/1999 | Thornton |
| 5,940,526 A | 8/1999 | Setlak et al. |
| 5,963,679 A | 10/1999 | Setlak |
| 6,067,368 A | 5/2000 | Setlak et al. |
| 6,259,804 B1 | 7/2001 | Setlak et al. |
| 6,392,167 B1 | 5/2002 | Nakagawa |
| 6,570,557 B1 | 5/2003 | Westerman et al. |
| 6,621,487 B2 | 9/2003 | Iwasaki et al. |
| 6,704,005 B2 | 3/2004 | Kato et al. |
| 6,771,280 B2 | 8/2004 | Fujisaki et al. |
| 6,788,288 B2 | 9/2004 | Ano |
| 7,075,316 B2 | 7/2006 | Umeda et al. |
| 7,106,720 B2 | 9/2006 | Ozluturk et al. |
| 7,292,229 B2 | 11/2007 | Morag et al. |
| 7,372,455 B2 | 5/2008 | Perski et al. |
| 7,451,050 B2 | 11/2008 | Hargreaves |
| 7,616,786 B2 | 11/2009 | Setlak |
| 7,812,827 B2 | 10/2010 | Hotelling et al. |
| 7,868,874 B2 | 1/2011 | Reynolds |
| 8,338,724 B2 | 12/2012 | Reynolds |
| 2002/0049070 A1 | 4/2002 | Bick |
| 2002/0050983 A1 | 5/2002 | Liu et al. |
| 2002/0173337 A1 | 11/2002 | Hajimiri et al. |
| 2002/0185981 A1 | 12/2002 | Dietz et al. |
| 2003/0030628 A1 | 2/2003 | Sato et al. |
| 2003/0035570 A1 | 2/2003 | Benkley, III |
| 2003/0067449 A1 | 4/2003 | Yoshikawa et al. |
| 2003/0076306 A1 | 4/2003 | Zadesky et al. |
| 2003/0133432 A1 | 7/2003 | Moerder |
| 2004/0056785 A1 | 3/2004 | Webster et al. |
| 2004/0056849 A1 | 3/2004 | Lohbihler et al. |
| 2004/0081339 A1 | 4/2004 | Benkley, III |
| 2005/0005703 A1 | 1/2005 | Saito et al. |
| 2005/0024065 A1 | 2/2005 | Umeda et al. |
| 2005/0052425 A1 | 3/2005 | Zadesky et al. |
| 2005/0073324 A1 | 4/2005 | Umeda et al. |
| 2005/0122785 A1 | 6/2005 | Umeda et al. |
| 2005/0150697 A1 | 7/2005 | Altman et al. |
| 2006/0293017 A1 | 12/2006 | Kim et al. |
| 2007/0047669 A1 | 3/2007 | Mak et al. |
| 2007/0062852 A1 | 3/2007 | Zachut et al. |
| 2007/0109274 A1 | 5/2007 | Reynolds |
| 2008/0158167 A1* | 7/2008 | Hotelling et al. ............ 345/173 |
| 2008/0192018 A1 | 8/2008 | Park et al. |
| 2009/0135973 A1 | 5/2009 | He |
| 2009/0143031 A1 | 6/2009 | Shah |
| 2009/0189867 A1 | 7/2009 | Krah et al. |
| 2009/0273579 A1 | 11/2009 | Zachut et al. |
| 2009/0322351 A1 | 12/2009 | McLeod |
| 2009/0322578 A1 | 12/2009 | Petrovic |
| 2010/0059295 A1 | 3/2010 | Hotelling |
| 2010/0060589 A1 | 3/2010 | Wilson |
| 2010/0060591 A1 | 3/2010 | Yousefpor et al. |
| 2010/0110037 A1 | 5/2010 | Huang et al. |
| 2010/0159858 A1 | 6/2010 | Dent et al. |
| 2010/0189197 A1 | 7/2010 | Nakatani |
| 2010/0321331 A1 | 12/2010 | Oda et al. |
| 2011/0037724 A1 | 2/2011 | Paulsen et al. |
| 2011/0063993 A1 | 3/2011 | Wilson et al. |
| 2011/0084857 A1 | 4/2011 | Marino et al. |
| 2012/0056841 A1* | 3/2012 | Krenik et al. ................ 345/174 |

FOREIGN PATENT DOCUMENTS

| | | |
|---|---|---|
| KR | 20100042761 A | 4/2010 |
| WO | 0247018 A2 | 6/2002 |
| WO | 2004107146 A2 | 12/2004 |

OTHER PUBLICATIONS

International Searching Authority, PCT Written Opinion of the International Searching Authority in PCT International Application No. PCT/US2011/051998, mailed Feb. 23, 2012.
USPTO, Ex parte Quayle Office Action for U.S. Appl. No. 13/679,355, mailed Apr. 5, 2013.
USPTO, Office Action for U.S. Appl. No. 13/161,267, mailed Apr. 4, 2013.
USPTO, Final Office Action in U.S. Appl. No. 13/161,267, mailed Sep. 10, 2013.
Smith, et al.; "Code-Division Multiplexing of a Sensor Channel: A Software Implementation"; IEEE Journal; Apr. 1999; pp. 725-731; vol. 17, No. 4.
Cichocki, et al.; "A Switched-Capacitor Interface for Capacitive Sensors Based on Relaxation Oscillators"; IEEE Journal; Oct. 1990; pp. 797-799; vol. 39, No. 5.
Huang, et al; "Electronic Transducers for Industrial Measurement of Low Value Capacitances"; J. Phys. E: Sci. Instrum. 21 1988; pp. 242-250; IOP Publishing Printed in the U.K.
Philipp, Hal; "Charge Transfer Sensing", pp. 1-9; Copyright 1997.
Zimmerman, et al.; "Applying Electric Field Sensing to Human-Computer Interfaces", MIT Media Laboratory; pp. 1-8; to be published in (IEEE SIG) CHI May 1995.
Yamada, et al.; "A Switched-Capacitor Interface for Capacitive Pressure Sensors", IEEE Journal; Feb. 1992; pp. 81-86; vol. 41, No. 1.
Smith, et al.; "Electric Field Sensing for Graphical Interfaces"; IEEE Computer Graphics and Applications; May/Jun. 1998; pp. 54-60.
Vigoda, Benjamin; "A Nonlinear Dynamic System for Spread Spectrum Code Acquisition"; MIT Media Laboratory; pp. 10-90, Aug. 9, 1999.
International Search Report for International Application No. PCT/US2006/040266, mailed Mar. 30, 2007.
Chinese Office Action 200680042701.5 dated May 25, 2011.
International Search Report for International Application No. PCT/US2011/051998, mailed Feb. 23, 2012.
Japan Patent Office "Notice of Reasons for Rejection" mailed Feb. 29, 2012 for Japanese Patent Application No. P2008-541174.
Yam, Y.-O et al. "Innovative Demodulation Method for SSB Technique" IEE Proc.-Circuits Devices Syst., vol. 146, No. 3, Jun. 1999.
West, J.D.K. "The Application of the Asymmetric Polyphase Filter in an SSB Transceiver" Grinel Natal Branch of Grinaker Electronics, IEEE 1991.
Chinese Office Action 200680042701.5 dated Sep. 14, 2011.
United States Patent and Trademark Office, Office Action for U.S. Appl. No. 12/962,096, dated Jun. 19, 2012.
United States Patent and Trademark Office, Notice of Allowance for U.S. Appl. No. 12/962,110, dated Jul. 16, 2012.
United States Patent and Trademark Office, U.S. Notice of Allowance dated Aug. 20, 2012 for U.S. Appl. No. 12/962,096.
USPTO, Notice of Allowance and Fee(s) Due for U.S. Appl. No. 13/679,355, mailed Jun. 11, 2013.
United States Patent and Trademark Office, U.S. Office Action mailed Aug. 15, 2013 for U.S. Appl. No. 13/233,790.
USPTO, Office Action in U.S. Appl. No. 13/233,781, mailed Jul. 18, 2013.

* cited by examiner

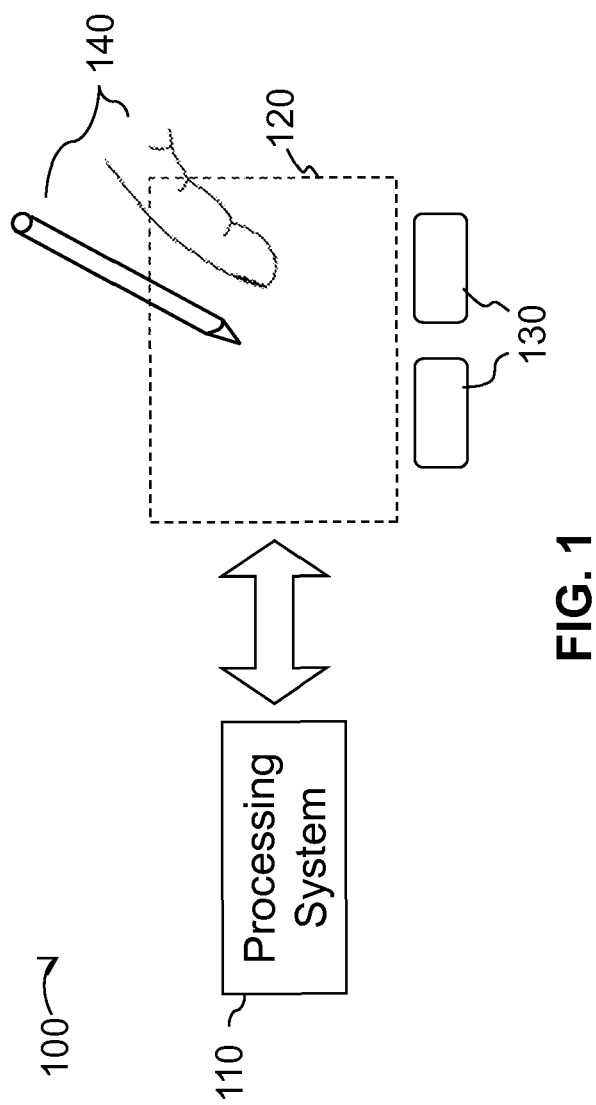

SYSTEMS AND METHODS FOR SENSOR DEVICES HAVING A NON-COMMENSURATE NUMBER OF TRANSMITTER ELECTRODES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

In the interest of improving signal levels, it is often desirable to drive sets of transmitter electrodes during different periods in "blocks"—e.g., code division multiplexing (CDM) blocks. However, when the number of transmitter electrodes utilized in a sensor device is not an integer multiple of the block size (i.e., the code block size is "non-commensurate" with the number of transmitters), there are a number of residual transmitter rows, which can lead to an uneven level of signal improvement.

BRIEF SUMMARY OF THE INVENTION

A processing system for an input device in accordance with one embodiment includes a transmitter module, a receiver module, and a determination module. The transmitter module is coupled to a plurality of transmitter electrodes comprising a first set of transmitter electrodes and a second set of transmitter electrodes, wherein the first set of transmitter electrodes and the second set of transmitter electrodes are disjoint and have different sizes. The transmitter module is configured to simultaneously transmit a first plurality of transmitter signals with the first set of transmitter electrodes during a first period, and to simultaneously transmit a second plurality of transmitter signals with the second set of transmitter electrodes during a second period, wherein the first period and the second period are non-overlapping. During the first period, each of the first plurality of transmitter signals is based on a different sequence of a code, and, during the second period, each of the second plurality of transmitter signals is based on a different sequence of the code, wherein the code comprises a set of mathematically independent sequences and has a size equal to the size of the first set of transmitter electrodes. The receiver module is coupled to a plurality of receiver electrodes and configured to receive first resulting signals during the first period and second resulting signals during the second period. The determination module is configured to produce a plurality of demodulated signals based on the code, the first resulting signals, and the second resulting signals, and to determine positional information for an input object in a sensing region of the input device based on the demodulated signals.

A sensor device in according to one embodiment includes a plurality of transmitter electrodes comprising a first set of electrodes and a second set of electrodes, wherein the first set of transmitter electrodes and second set of transmitter electrodes are disjoint and have different sizes; a plurality of receiver electrodes; and a processing system communicatively coupled to the plurality of transmitter electrodes and the plurality of receiver electrodes. The processing system is configured to simultaneously transmit a first plurality of transmitter signals with the first set of transmitter electrodes during a first period, and to simultaneously transmit a second plurality of transmitter signals with the second set of transmitter electrodes during a second period, wherein the first period and the second period are non-overlapping, wherein, during the first period, each of the first plurality of transmitter signals is based on a different sequence of a code, and, during the second period, each of the second plurality of transmitter signals is based on a different sequence of the code, wherein the code comprises a set of mathematically independent sequences and has a size equal to the size of the first set of transmitter electrodes. The processing system is further configured to receive first resulting signals during the first period and second resulting signals during the second period; and produce a plurality of demodulated signals based on the code, the first resulting signals, and the second resulting signals, and to determine positional information for an input object in a sensing region of the input device based on the demodulated signals.

A method of capacitive sensing in accordance with one embodiment includes: simultaneously transmitting a first plurality of transmitter signals with a first set of transmitter electrodes during a first period, and simultaneously transmitting a second plurality of transmitter signals with a second set of transmitter electrodes during a second period, wherein the first set of transmitter electrodes and second set of transmitter electrodes are disjoint and have different sizes, and the first period and the second period are non-overlapping; wherein, during the first period, each of the first plurality of transmitter signals is based on a different sequence of a code, and, during the second period, each of the second plurality of transmitter signals is based on a different sequence of the code, the code comprising a set of mathematically independent sequences having a size equal to the size of the first set of transmitter electrodes; receiving first resulting signals during the first period and second resulting signals during the second period; and producing a plurality of demodulated signals based on the code, the first resulting signals, and the second resulting signals, and to determine positional information for an input object in a sensing region of the input device based on the demodulated signals.

BRIEF DESCRIPTION OF DRAWINGS

The present invention will hereinafter be described in conjunction with the appended drawings, where like designations denote like elements, and:

FIG. 1 is a block diagram of an example system that includes an input device in accordance with an embodiment of the invention;

DETAILED DESCRIPTION OF THE INVENTION

Figures 2A, 2B:
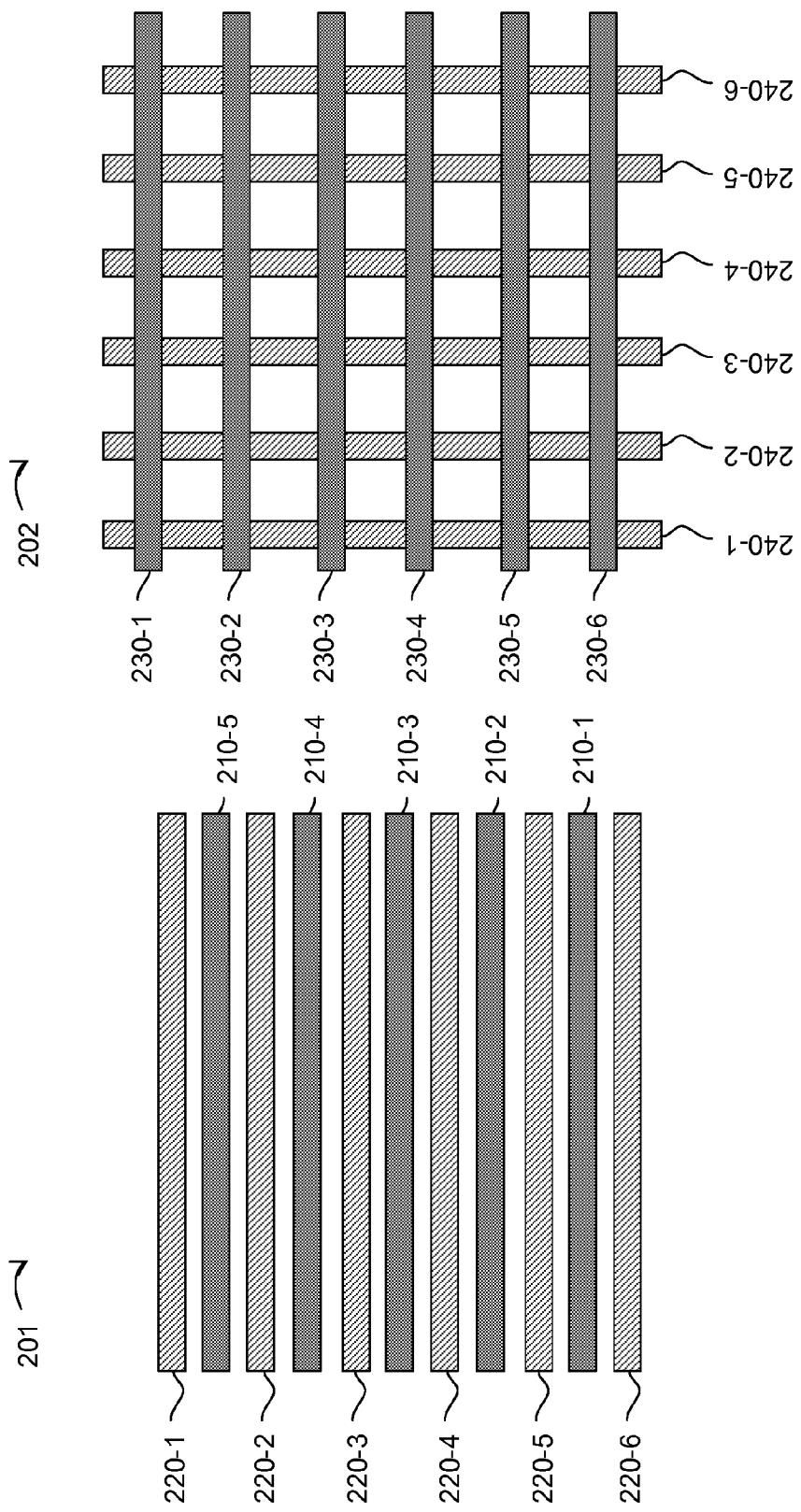
FIG. 2A is a conceptual block diagram depicting an example electrode pattern.
FIG. 2B is a conceptual block diagram depicting an example electrode pattern.

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

FIGS. 2A and 2B illustrate, conceptually, example sets of capacitive sensor electrodes configured to sense in a sensing region. For clarity of illustration and description, FIG. 2A shows a pattern of sensor electrodes arranged substantially parallel to each other, while FIG. 2B shows a pattern of sensor electrodes arranged substantially perpendicular to each other. It will be appreciated, however, that the invention is not so limited, and that a variety of electrode patterns, shapes, and orientations may be suitable in any particular embodiment. The embodiment illustrated in FIG. 2B may further be referred to as an "imaging" sensor.

The sensor electrodes of FIGS. 2A and 2B are typically ohmically isolated from each other. According to various embodiments, the sensor electrodes can be located in a single layer or can be separated by one or more substrates. For example, they may be disposed on opposite sides of the same substrate, or on different substrates that are laminated together.

The capacitive coupling between the transmitter electrodes and receiver electrodes change with the proximity and motion of input objects in the sensing region associated with the transmitter electrodes and receiver electrodes. In the embodiment depicted in FIG. 2A, some sensor electrodes 210 (e.g., 210-1, 210-2, etc.) are configured as receiver electrodes, and some sensor electrodes 220 (e.g., 220-1, 220-2, etc.) are configured as transmitter electrodes. In an embodiment depicted in FIG. 2B, some sensor electrodes 230 (e.g., 230-1, 230-2, etc.) are configured as receiver electrodes, and some sensor electrodes 240 (e.g., 240-1, 240-2, etc.) are configured as transmitter electrodes.

In each of the illustrated embodiments (as well as other example embodiments) the receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes in FIGS. 2A and 2B) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 3:
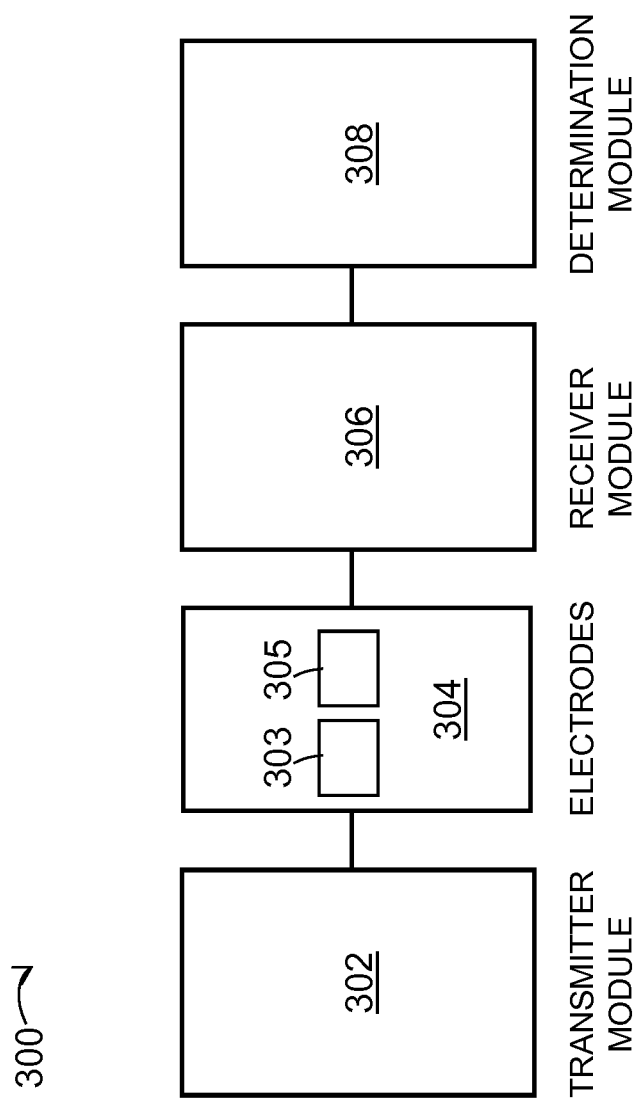
FIG. 3 is a conceptual diagram depicting an example processing system in accordance with the present invention.

Referring now to the conceptual block diagram depicted in FIG. 3, various embodiments of an example processing system 110 as shown in FIG. 1 may include a system 300. System 300, as illustrated, generally includes transmitter module 302 communicatively coupled via a set of sensor electrodes 304 to receiver module 306, which itself is coupled to determination module 308. Sensor electrodes 304 include one or more transmitter electrodes 303 and one or more receiver electrodes 305 (e.g., as depicted in FIGS. 2A and 2B). In one embodiment, sensor electrodes 304 may be constructed from opaque or substantially opaque conductive materials. In other embodiments sensor electrodes 304 can be constructed from transparent or substantially transparent conductive material, such as patterned ITO, ATO, carbon fiber nanotubes, or other substantially transparent materials. In one embodiment, transmitter electrodes 303 are constructed from a conductive material of substantially uniform resistivity, so that voltage variations can be imposed on it by the driving methods described below. In some embodiments, the conductive material may have non-uniform resistivity, such as having a higher or lower resistivity on the distal ends than in the middle portion. Other forms of non-uniform resistivity can also be implemented. In one embodiment, the voltage variations may be defined as the amount of change in voltage as a function of a small change in position along a transmitter electrode comprising resistive material. In practical embodiments, sensor electrodes 304 may be accompanied by (and coupled to) various conductive traces, electro-mechanical bonds, and the like (not shown).

In general, transmitter module 302 includes any combination of software and/or hardware (e.g., transmitter circuitry) configured to simultaneously transmit a first plurality of transmitter signals with a first set of transmitter electrodes during a first period, and to simultaneously transmit a second plurality of transmitter signals with a second set of transmitter electrodes during a second period. The first period and the second period are non-overlapping (i.e., do not overlap on a time scale). During the first period, each of the first plurality of transmitter signals is based on a different sequence of a code. Similarly, during the second period, each of the second plurality of transmitter signals is based on a different sequence of the code. The code comprises a set of mathematically independent sequences and has a size equal to the size of the first set of transmitter electrodes.

Receiver module 306 includes any combination of software and/or hardware (e.g., receiver circuitry) configured to receive first resulting signals during the first period, and to receive second resulting signals during the second period. Determination module 308 includes any combination of software and/or hardware (e.g., circuitry) configured to to produce a plurality of demodulated signals based on the code, the first resulting signals, and the second resulting signals, and to determine positional information for an input object in a sensing region of the input device based on the demodulated signals.

Figure 4:
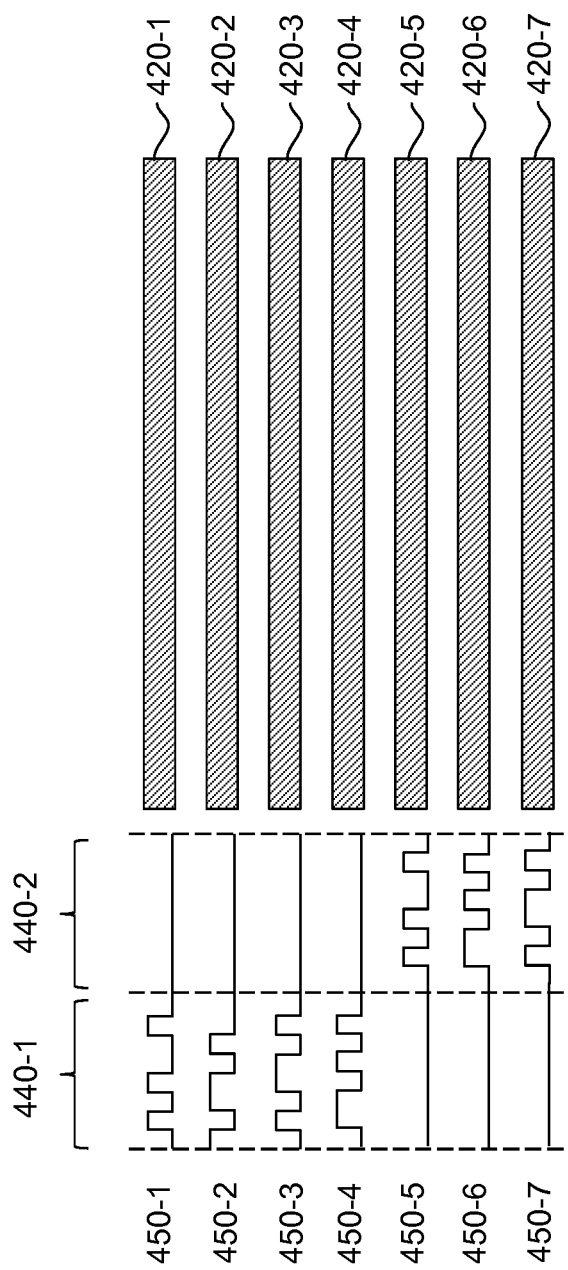
FIG. 4 is a conceptual block diagram depicting an example set of transmitter electrodes and transmitter signals.

FIG. 4 depicts, in simplified form, exemplary transmitter electrodes 420 and corresponding transmitter signals 450 useful in describing the present invention. As will be described in further detail below, the illustrated embodiment is an example in which the number of transmitters (i.e., seven) is a non-integer multiple of the desired block size (i.e., four). In this regard, for the purposes of illustration, seven substantially parallel transmitter electrodes 420 (420-1 to 420-7) are shown. The invention is not so limited, however, as any number of such transmitter electrodes 420 may be used in any particular implementation.

For ease of reference, exemplary transmitter signals 450 (450-1 to 450-7) are illustrated adjacent to their respective transmitter electrodes 420 (420-1 to 420-7), and are aligned along a common time axis. The transmitter signals are illustrated for two periods: period 440-1 and period 440-2, period 440-2 being subsequent in time to period 440-1. As shown, the two periods are non-overlapping—i.e., there does not exist a point in time that occurs during both periods 440-1 and 440-2. While transmitter signals 450 are illustrated as a series of binary transitions, the invention is not so limited.

In the illustrated embodiment, the seven transmitter electrodes are split into two sets: a first set including transmitter electrodes 420-1 through 420-4, and a second set including transmitter electrodes 420-5 through 420-7. The two sets are disjoint (in the set theoretical sense) in that they do not include any common member. Stated another way, the two sets do not share a common transmitter electrode 420. Further, the two sets have different sizes: the first set has a size of four, and the second set has a size of three.

The transmitter module (e.g., transmitter module 302 of FIG. 1) is configured to simultaneously transmit transmitter signals 450-1 through 450-4 with the first set of transmitter electrodes (420-1 through 420-4) during period 440-1, and to simultaneously transmit transmitter signals 450-5 through 450-7 with the second set of transmitter electrodes (420-5 through 420-7) during period 440-2. Each of the transmitter signals 450 are based on a particular sequence of a code. The code (described in further detail below) thus includes a discrete number of sequences. In accordance with the present invention, during period 440-1 each of the transmitter signals 450-1 through 450-4 are based on a different sequence of the code. Similarly, during period 440-2, each of the transmitter signals 450-5 through 450-7 are based on a difference sequence of a code. In accordance with one embodiment, the size of the code (i.e., the number of individual code sequences within the code) is equal to the size of the first set of transmitter electrodes. Thus, in the illustrated embodiment, the code would have a size of four.

In accordance with the present invention the code sequences are "mathematically independent." That is, the code sequences are selected such that they provide meaningful independent results—.e.g, exhibit zero or low cross-correlation. Code sequences may be considered "mathematically independent" even if the cross-correlation of the resulting signals is not strictly zero, as long as the signals provide meaningful independent results. In one embodiment, the mathematically independent code sequences are orthogonal to each other. In other embodiments, the mathematically independent code sequences are substantially orthogonal to each other. In one embodiment, code divisional multiple access (CDMA) is implemented. In one embodiment, for example, the code sequences are pseudo-random sequence codes. In other embodiments, Walsh-Hadamard codes, m-sequence codes, Gold codes, Kasami codes, Barker codes, or other appropriate quasi-orthogonal or orthogonal codes are used. In some embodiments, the code sequences are linearly independent as that term is known in the art. In one embodiment, the code is a binary code (e.g., levels of −1 and +1). In another embodiment, the code is a ternary code (e.g., levels of −1, 0, and +1).

In one embodiment, during a first sub-period of the first period (e.g., during a particular signal transition), at least one of the first plurality of transmitter signals has a polarity that is different from a polarity of each of the other transmitter signals. That is, for example, transmitter signal 450-1 might have a negative polarity (e.g., corresponding to a binary '1') during particular sub-period (i.e., a cluster), while transmitter signals 450-2 through 450-4 each have a positive polarity (e.g., corresponding to a binary '0').

With continued reference to FIG. 4, the first set of transmitter signals during period 440-1 can be referred to as a "code block" (i.e., a block of code sequences during a particular period), where each row of the code block includes a series of "clusters." The first code block corresponds to period 440-1, and the second code block corresponds to period 440-2. Consequently, each code block can be represented in matrix form, described in further detail below. In FIG. 4, the total number of transmitters (seven) is not an integer multiple of the code block size (four). Stated another way, the code block size is "non-commensurate" with the number of transmitters. Accordingly, transmitter electrodes 450-5 through 450-7 are "residual" transmitter electrodes in that they must be handled (e.g., deconvolved) in a manner than is different from the code block illustrated during period 440-1.

Figure 5:
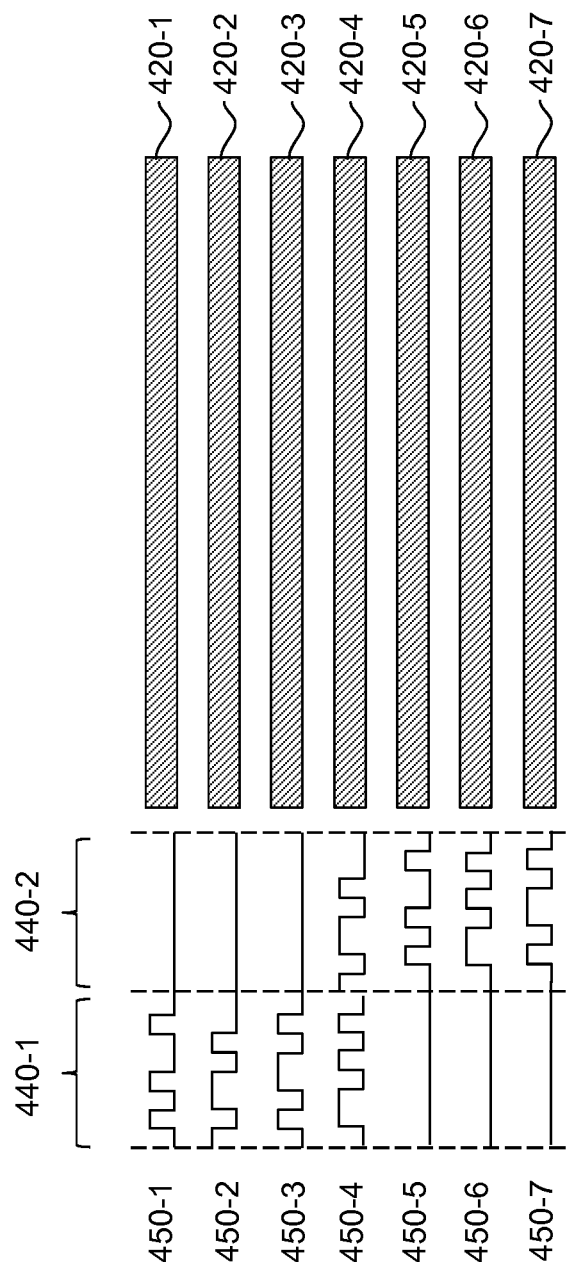
FIG. 5 is a conceptual block diagram depicting an example set of transmitter electrodes and transmitter signals.

In accordance with one embodiment of the invention, during the second period 440-2, the transmitter module is configured to simultaneously transmit transmitter signals with the second set of transmitter electrodes along with at least one transmitter electrode selected from the first set of transmitter electrodes. Referring to FIG. 5, for example, during period 440-2, transmitter electrode 420-4 is utilized to transmit a transmitter signal 450-4 based on a sequence of the code, rather than being inactive as it is in the corresponding period of FIG. 4. That is, transmitter electrode 420-4 is used during both periods 440-1 and 440-2, effectively "filling out" the code block during period 440-2.

While FIG. 5 depicts an example where one transmitter electrode (i.e., 420-4) from the first set of transmitter electrodes is used during the second period 440-2, the invention is not so limited. Any number of such transmitter electrodes (two, three, or more) may be used. In one embodiment, the common transmitter electrodes (i.e., the electrodes used during both periods 440-1 and 440-2) are adjacent to the residual transmitter electrodes, as illustrated in FIG. 5. In other embodiments, non-adjacent transmitter electrodes are used.

In one embodiment, the number of transmitter electrodes selected from the first set of transmitter electrodes is equal to the difference between the size of the first set of transmitter electrodes and the size of the second set of transmitter electrodes. That is, as illustrated in FIG. 5, the number of transmitter electrodes selected from the first set (i.e., one) is equal to the difference between the size of the first set (four) and the size of the second set (three). In other embodiments, the number of selected transmitter electrodes is not equal to the difference in set sizes.

As mentioned previously, the determination module 308 is configured to produce a plurality of demodulated signals based on the code, the first resulting signals, and the second resulting signals, where the first resulting signals are received during the first period (period 440-1) and the second resulting signals are received during the second period (period 440-2). In one embodiment, at least one of the demodulated signals is based on both the first plurality of resulting signals and the second plurality of resulting signals. Stated another way, using FIG. 5 as an example, the demodulated signal may be based on the resulting signal associated with transmitter 450-4 during both periods 440-1 and 440-2. In other embodiments, only one of the resulting signals is used for demodulation, and the other is effectively discarded.

In one embodiment, the resulting signals from the common electrodes are averaged over multiple blocks. In FIG. 5, for example, the resulting signal from transmitter electrode 450-4 is averaged over periods 440-1 and 440-2. The averaged signal is then used in the deconvolution process.

Figure 6:
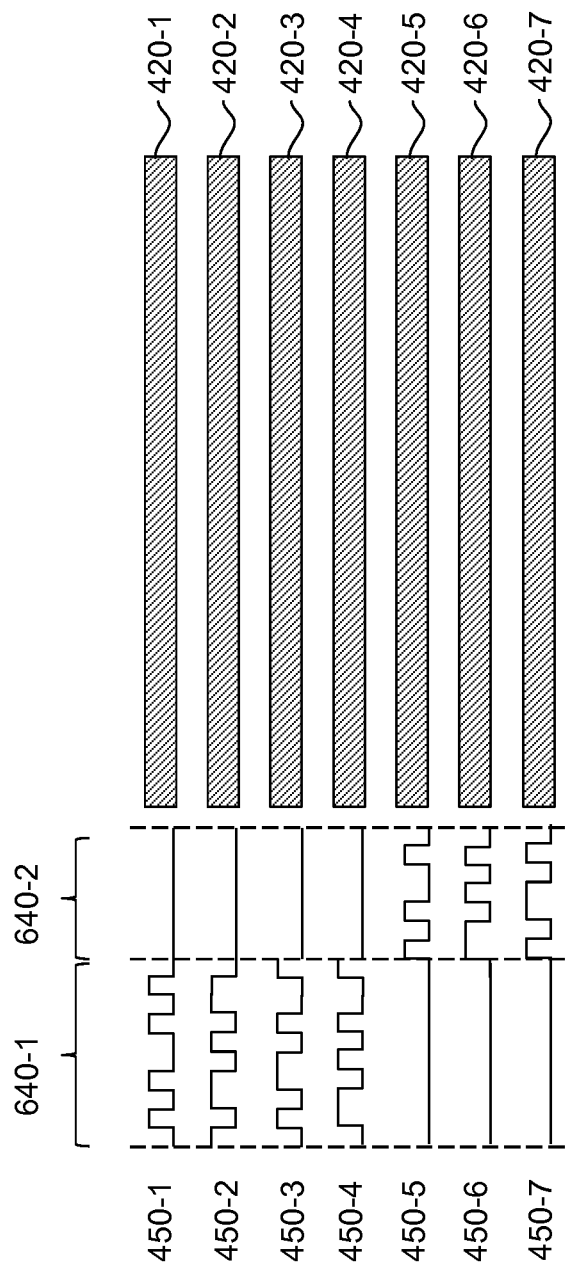
FIG. 6 is a conceptual block diagram depicting an example set of transmitter electrodes and transmitter signals.

In one embodiment, the determination module is configured to produce the plurality of demodulated signals by applying a first deconvolving process to the first resulting signals and applying a second deconvolving process to the second resulting signals, wherein the first deconvolving process is different from the second deconvolving process. Referring to FIG. 6, for example, two periods 640-1 and 640-2 are illustrated, wherein a different deconvolving process may be used for resulting signals produced during the first period 640-1 than is used during the second period 640-2. In this case, the first deconvolution matrix (corresponding to period 640-1) is square—e.g., a 4×4 matrix H. If the first transmission block is an orthogonal matrix, then deconvolution for the second block (corresponding to period 640-2) is simply a subset of H, e.g. a 4×3 matrix, where the last column is removed from H, just as the second code block is formed in this embodiment by eliminating the last row of the first code block.

It should be appreciated that while the preceding examples, in the interest of simplicity, are described in the context of two-block embodiments, the invention is not so limited. Depending upon the number of transmitter electrodes and the block size, any number of blocks may be used. For example, if twenty-three transmitter electrodes were to be employed in the context of a 4×4 block size, then six blocks would be required.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
   A transmitter module comprising transmitter circuitry, the transmitter module coupled to a plurality of transmitter electrodes comprising a first set of transmitter electrodes and a second set of transmitter electrodes, wherein the first set of transmitter electrodes and the second set of transmitter electrodes are disjoint and have different sizes;
   wherein the transmitter module is configured to simultaneously transmit a first plurality of transmitter signals with the first set of transmitter electrodes during a first period, and to simultaneously transmit a second plurality of transmitter signals with the second set of transmitter electrodes during a second period, wherein the first period and the second period are non-overlapping;
   wherein, during the first period, each of the first plurality of transmitter signals is based on a different sequence of a code, and, during the second period, each of the second plurality of transmitter signals is based on a different sequence of the code, wherein the code comprises a set of mathematically independent sequences and has a size equal to the size of the first set of transmitter electrodes;
   a receiver module coupled to a plurality of receiver electrodes and configured to receive first resulting signals during the first period and second resulting signals during the second period; and
   a determination module configured to produce a plurality of demodulated signals based on the code, the first resulting signals, and the second resulting signals, and to determine positional information for an input object in a sensing region of the input device based on the demodulated signals.

2. The processing system of claim 1, wherein the transmitter module is configured to simultaneously transmit the second plurality of transmitter signals with the second set of transmitter electrodes and at least one transmitter electrode selected from the first set of transmitter electrodes during the second period.

3. The processing system of claim 2, wherein the at least one transmitter electrode comprises a number of transmitter electrodes equal to the difference between the size of the first set of transmitter electrodes and the size of the second set of transmitter electrodes.

4. The processing system of claim 2, wherein a demodulated signal of the plurality of demodulated signals is based on both the first resulting signals and the second resulting signals.

5. The processing system of claim 1, wherein the sum of the sizes of the first set of transmitter electrodes and the second set of transmitter electrodes is a non-integer multiple of the size of the set of mathematically independent sequences.

6. The processing system of claim 1, wherein the determination module is configured to produce the plurality of demodulated signals by applying a first deconvolving process to the first resulting signals and applying a second deconvolving process to the second resulting signals, wherein the first deconvolving process is different from the second deconvolving process.

7. The processing system of claim 1, wherein during a first sub-period of the first period, at least one of the first plurality of transmitter signals has a polarity different than a polarity of each of other transmitter signals in the first plurality of transmitter signals.

8. The processing system of claim 1, wherein the code is a ternary code.

9. An input device comprising:
   a plurality of transmitter electrodes comprising a first set of transmitter electrodes and a second set of transmitter electrodes, wherein the first set of transmitter electrodes and the second set of transmitter electrodes are disjoint and have different sizes;
   a plurality of receiver electrodes; and
   a processing system communicatively coupled to the plurality of transmitter electrodes and the plurality of receiver electrodes, the processing system configured to:
      simultaneously transmit a first plurality of transmitter signals with the first set of transmitter electrodes during a first period, and to simultaneously transmit a second plurality of transmitter signals with the second set of transmitter electrodes during a second period, wherein the first period and the second period are non-overlapping, wherein, during the first period, each of the first plurality of transmitter signals is based on a different sequence of a code, and, during the second period, each of the second plurality of transmitter signals is based on a different sequence of the code, wherein the code comprises a set of mathematically independent sequences and has a size equal to the size of the first set of transmitter electrodes;
      receive first resulting signals during the first period and second resulting signals during the second period; and
      produce a plurality of demodulated signals based on the code, the first resulting signals, and the second resulting signals, and to determine positional information for an input object in a sensing region of the input device based on the demodulated signals.

10. The input device of claim 9, wherein the processing system is configured to simultaneously transmit the second plurality of transmitter signals with the second set of transmitter electrodes and at least one transmitter electrode selected from the first set of transmitter electrodes during the second period.

11. The input device of claim 10, wherein the at least one transmitter electrode comprises a number of transmitter electrodes equal to the difference between the size of the first set of transmitter electrodes and the size of the second set of transmitter electrodes.

12. The input device of claim 10, wherein a demodulated signal of the plurality of demodulated signals is based on both the first resulting signals and the second resulting signals.

13. The input device of claim 9, wherein the sum of the sizes of the first set of transmitter electrodes and the second set of transmitter electrodes is a non-integer multiple of the size of the set of mathematically independent sequences.

14. The input device of of claim 9, wherein during a first sub-period of the first period, at least one of the first plurality of transmitter signals has a polarity different than a polarity of each of the other transmitter signals.

15. A method of capacitive sensing, the method comprising:
    simultaneously transmitting a first plurality of transmitter signals with a first set of transmitter electrodes during a first period, and simultaneously transmitting a second plurality of transmitter signals with a second set of transmitter electrodes during a second period, wherein the first set of transmitter electrodes and second set of transmitter electrodes are disjoint and have different sizes, and the first period and the second period are non-overlapping; wherein, during the first period, each of the first plurality of transmitter signals is based on a different sequence of a code, and, during the second period, each of the second plurality of transmitter signals is based on a different sequence of the code, the code comprising a set of mathematically independent sequences having a size equal to the size of the first set of transmitter electrodes;
    receiving first resulting signals during the first period and second resulting signals during the second period; and
    producing a plurality of demodulated signals based on the code, the first resulting signals, and the second resulting signals, and to determine positional information for an input object in a sensing region of the input device based on the demodulated signals.

16. The method of claim 15, further including simultaneously transmitting the second plurality of transmitter signals with the second set of transmitter electrodes and at least one transmitter electrode selected from the first set of transmitter electrodes during the second period.

17. The method of claim 16, wherein the at least one transmitter electrode comprises a number of transmitter electrodes equal to the difference between the size of the first set of transmitter electrodes and the size of the second set of transmitter electrodes.

18. The method of claim 16, wherein a demodulated signal of the plurality of demodulated signals is based on both the first resulting signals and the second resulting signals.

19. The method of claim 15, wherein the sum of the sizes of the first set of transmitter electrodes and the second set of transmitter electrodes is a non-integer multiple of the size of the set of mathematically independent sequences.

20. The method of claim 15, further including producing the plurality of demodulated signals by applying a first deconvolving process to the first resulting signals and applying a second deconvolving process to the second resulting signals, wherein the first deconvolving process is different from the second deconvolving process.

* * * * *